United States Patent [19]
Short

[11] 3,908,684
[45] Sept. 30, 1975

[54] RUPTURE DISK ASSEMBLY
[75] Inventor: Edward H. Short, Tulsa, Okla.
[73] Assignee: Black, Sivalls & Bryson, Inc., Houston, Tex.
[22] Filed: Nov. 4, 1974
[21] Appl. No.: 520,405

[52] U.S. Cl. ............................. 137/68; 220/89 A
[51] Int. Cl.² ...................................... F16K 17/40
[58] Field of Search ........ 137/68, 69, 71; 220/89 A; 251/61; 92/98 R

[56] References Cited
UNITED STATES PATENTS

| | | | |
|---|---|---|---|
| 2,047,049 | 7/1936 | Allen | 137/68 |
| 2,630,939 | 3/1953 | Jones | 220/89 A |
| 3,155,271 | 11/1964 | Summers et al. | 220/89 A |
| 3,467,120 | 9/1969 | Hill et al. | 137/68 |
| 3,526,336 | 9/1970 | Wood | 220/89 A |
| 3,575,088 | 4/1971 | Bauer | 92/98 R |
| 3,834,581 | 9/1974 | Solter et al. | 137/68 X |

*Primary Examiner*—Martin P. Schwadron
*Assistant Examiner*—Richard Gerard
*Attorney, Agent, or Firm*—C. Clark Dougherty, Jr.

[57] ABSTRACT

A rupture disk assembly of small integral construction comprising a substantially cylindrical housing having a reverse buckling rupture disk supported therein. An annular top supporting member is positioned within the housing adjacent to the rupture disk, which includes an annular lip portion extending outwardly around the periphery thereof. The upper end portion of the housing is folded over the outwardly extending lip portion of the supporting member so that the lip portion is deformed downwardly thereby rigidly clamping the supporting member and rupture disk within the housing.

14 Claims, 6 Drawing Figures

U.S. Patent    Sept. 30,1975    3,908,684
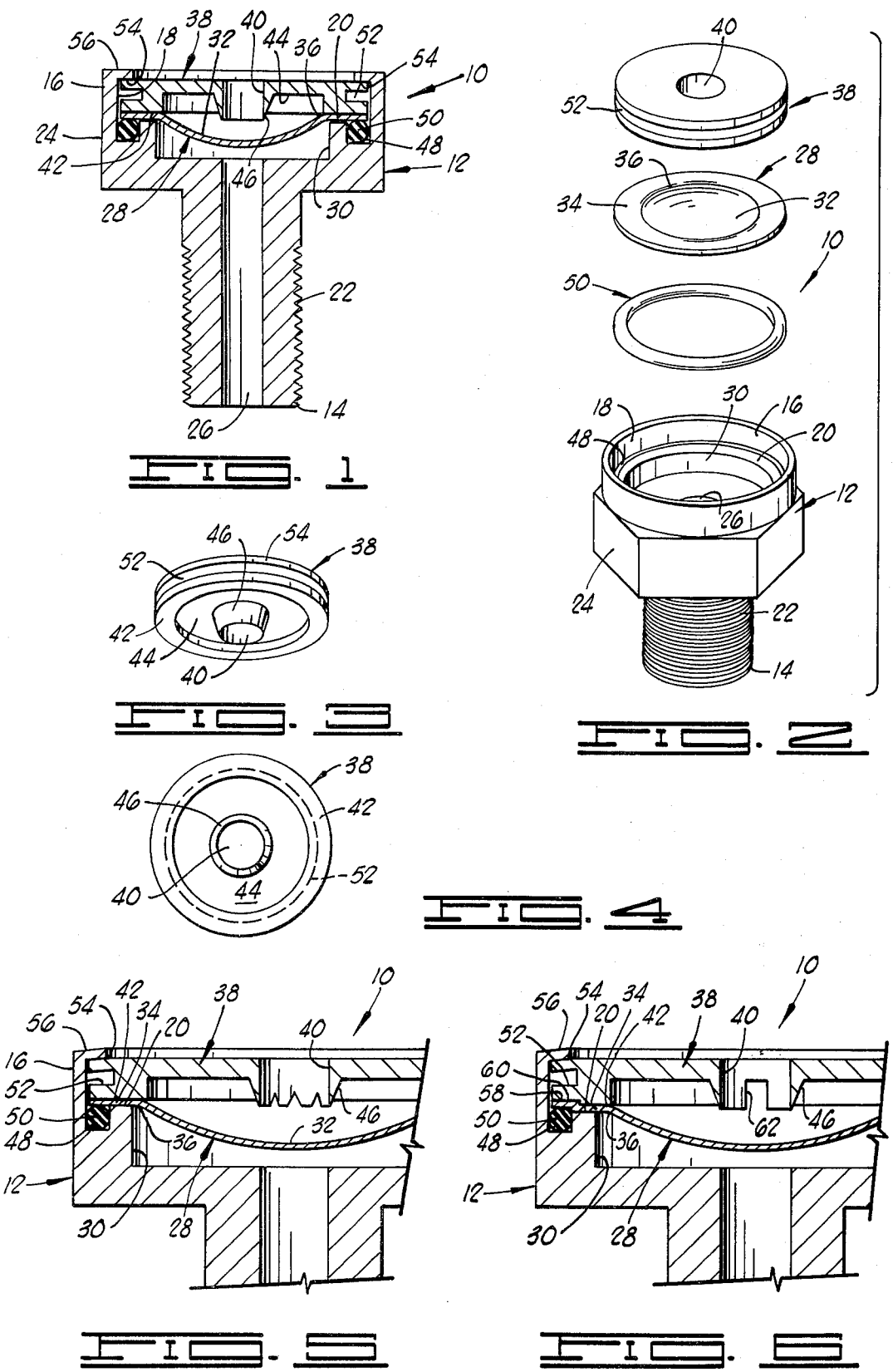

RUPTURE DISK ASSEMBLY

BACKGROUND OF THE INVENTION

1. Field of the Invention

This invention relates to safety pressure relief devices, and more particularly, but not by way of limitation, to rupture disk assemblies which are placed in pressure systems to insure relief in the event of an over pressure condition.

2. Description of the Prior Art

Many various pressure relief devices of the rupture disk type have been developed and used successfully heretofore. Generally, these devices are connected to a vessel or system containing fluids under pressure so that the rupture disk is exposed to the pressure. If an over pressure condition occurs within the vessel or system, i.e., a pressure exceeding the design rupture pressure of the disk, the disk ruptures relieving pressure from the vessel or system.

Recently, pressure relief devices including rupture disks of the reverse buckling type have been developed which are capable of containing fluid pressures at 90 percent or more of the design rupture pressure for long periods of time. Such reverse buckling rupture devices generally include a rupture disk having a concave-convex portion, the convex side of which is exposed to fluid pressure so that the disk is in a state of compression. When the pressure exerted on the disk reaches a level exceeding the design rupture pressure, the concave-convex portion of the disk reverses itself and then ruptures. In order to bring about the rupture of the disk in a manner such that full opening is achieved without fragmentation, knife blades have heretofore been used positioned with respect to the rupture disk so that upon reversal, the disk is cut open by the knife blades. Also, in lieu of knife blades, scores or grooves have been included on a surface of the concave-convex portion of the rupture disk so that lines of weakness are created therein and upon reaching rupture pressure, the disk reverses itself and then tears along the lines of weakness.

In many rupture disk assembly applications, the volume and rate of fluids required to be relieved in order to alleviate an over pressure condition is small. Thus, the rupture disk assembly can be small, and full opening of the rupture disk is not required. Prior to the present invention small reverse buckling rupture disk assemblies have generally not been available making the use of elaborate and expensive assemblies designed for full opening and for providing a relieving area of relatively large cross-sectional area necessary.

By the present invention a simple inexpensive integral rupture disk assembly is provided which due to the low cost thereof can simply be discarded and replaced after the rupture thereof.

SUMMARY OF THE INVENTION

The present invention provides a rupture disk assembly comprising a substantially cylindrical housing having an outlet end and an inlet end and including an annular shoulder in the interior thereof facing the outlet end. A reverse buckling rupture disk is positioned within the housing, the outer annular portion thereof lying adjacent and being supported on the annular shoulder in the housing. An annular supporting member adapted to fit within the housing adjacent the rupture disk including an annular surface to coact with the annular shoulder in the housing and support the annular outer portion of the rupture disk therebetween, is provided which includes an annular lip portion extending outwardly around the periphery thereof. The outlet end of the housing is folded over the outwardly extending lip portion of the supporting member so that the lip portion is deformed towards the inlet end of the housing and the supporting member and rupture disk are rigidly clamped against the annular shoulder in the housing.

It is, therefore, a general object of the present invention to provide an improved rupture disk assembly.

A further object of the present invention is the provision of a small relatively inexpensive integral rupture disk assembly particularly suitable for use in applications where a small relieving cross-sectional area is required.

Yet a further object of the present invention is the provision of a small integral rupture disk assembly which due to the relatively low cost thereof can simply be discarded and replaced as a unit after rupture.

Still a further object of the present invention is the provision of a small integral rupture disk assembly of the reverse buckling type having a long service life in cyclic pressure applications and being capable of substantially preventing leakage of pressurized fluids through the assembly.

Other and further objects, features and advantages of the present invention will be readily apparent to those skilled in the art upon a reading of the description of the preferred embodiments which follows when taken in conjunction with the accompanying drawings.

BRIEF DESCRIPTION OF THE DRAWINGS

FIG. 1 is a side elevational view of presently preferred apparatus of the present invention.

FIG. 2 is a perspective view showing the various parts of the apparatus of FIG. 1 in a disassembled condition.

FIG. 3 is a perspective view of the annular supporting member of FIGS. 1 and 2.

FIG. 4 is a bottom plan view of the annular supporting member of FIG. 3.

FIG. 5 is an enlarged partial view of an alternate form of the apparatus of the invention in cross-section.

FIG. 6 is an enlarged partial view of another alternate form of the invention in cross-section.

DESCRIPTION OF THE PREFERRED EMBODIMENTS

Referring now to the drawings, and particularly to FIGS. 1 and 2, the rupture disk assembly of the present invention is illustrated and generally designated by the numeral 10. The assembly 10 basically comprises a substantially cylindrical housing 12 having a hollow interior, an inlet end 14 and an outlet end 16. As illustrated in the drawings, the housing 12 is preferably formed in the shape of a fitting which can be conveniently threaded into a conventional female fitting. That is, the lower portion of the housing 12 and the inlet end 14 thereof are formed of reduced diameter with respect to the outlet end 16 and upper portion of the housing 12. The lower portion of the housing 12 includes conventional threads 22 disposed in the outside peripheral surface thereof, and the upper enlarged portion of the housing 12 is formed into a hex head 24 for facilitating the threading of the housing 12 into a conventional threaded fitting.

A central bore 26 is disposed in the housing 12 for communicating fluid pressure therethrough, and a counter bore or internal recess 18 is provided at the top portion of the housing 12 forming an annular shoulder 20 within the interior of the housing 12.

In the preferred embodiment of the invention, a reverse buckling rupture disk 28 is utilized in the apparatus 10, and in order to accommodate the concave-convex portion of the disk a second counter bore or internal recess 30 is provided within the housing 12. The recess 30 is of smaller diameter than the recess 18 thereby preserving the upwardly facing flat annular shoulder 20. As will be understood, if rupture disks of flat or other configuration are used with the apparatus 10, the recess 30 can be eliminated.

The rupture disk 28 is preferably a circular reverse buckling concave-convex chamber member formed of metal or other material having a predetermined design rupture pressure. The term "design rupture pressure" is used herein with respect to the rupture disk 28 to mean that pressure level which when exposed to the convex side of the disk 28 causes the disk 28 to reverse itself.

As shown best in FIG. 2, the rupture disk 28 preferably includes a central concave-convex portion 32 connected to an outer annular flat flange portion 34 by a transition connection 36. The disk 28 is positioned within the interior of the housing 12 with the convex side thereof facing the inlet end 14.

Referring particularly to FIGS. 1 through 4, an annular supporting member 38 is provided positioned within the housing 12 adjacent the rupture disk 28. The supporting member 38 is preferably cylindrical in shape and includes a central opening 40 through which pressure is relieved from the housing 12 upon rupture of the disk 28. As shown best in FIGS. 1 and 3, the supporting member 38 includes a flat annular surface 42 adapted to coact with the annular shoulder 20 of the housing 12 and support the annular flat flange portion 34 of the rupture disk 28 therebetween. An annular recess 44 is disposed in the face of the supporting member 38 adjacent the rupture disk 28, the inside diameter of which is less than the diameter of the opening 40 so that a cylindrical protuberance 46 is formed in the supporting member 38 facing the rupture disk 28. The leading edge of the protuberance 46 is sharpened thereby forming it into a circular knife blade which functions to cut the disk 28 upon reversal as will be further described hereinbelow.

As stated above, a variety of rupture disks can be utilized in the assembly 10 in lieu of the reverse buckling rupture disk 28 such as scored reverse buckling disks, flat disks and conventional concave-convex disks, i.e., concave-convex disks having the concave side exposed to fluid pressure. However, the use of a reverse buckling rupture disk is preferred in that such a disk has a long service life in cyclic pressure applications, i.e., in applications where the pressure cycles from a vacuum condition to a pressure condition and vice-versa. Further, reverse buckling rupture disks can be operated at 90 percent or more of their design rupture pressures and achieve high accuracy.

while reverse buckling rupture disks of varying configuration can be used, a reverse buckling rupture disk of the type described above, i.e., having a concave-convex portion connected to an annular flat flange portion by a transition connection is most preferred. Further, the rupture disk 28 is preferably sized so that the transition connection 36 thereof lies adjacent to the internal corner formed by the annular shoulder 20 and the sides of the recess 30 in the housing 12. In addition, it is preferable that the outside diameter of the recess 44 disposed in the supporting member 38 is smaller than the inside diameter of the recess 30 in the housing 12 so that an inwardly extending shoulder is provided by the flat annular surface 42 of supporting member 38 which supports the transition connection 36 of the rupture disk 28. The support of the transition connection 36 prevents the rupture disk 28 from prematurely buckling inwardly at the transition connection when under load.

In high pressure applications and other applications where leakage through the apparatus 10 cannot be tolerated, means for insuring a leak proof seal between the rupture disk 28 and the internal portion of the housing 12 exposed to fluid pressure are provided. More specifically, a continuous annular groove 48 is disposed in the upwardly facing surface of the shoulder 20 within the housing 12. The groove 48 is positioned inwardly from the sides of the recess 30 so that a portion of the upwardly facing flat surface of the shoulder 20 in the form of an annulet remains in the housing 12 and the groove 48 faces the annular flat flange 34 of the rupture disk 28. An annular seal ring 50 formed of deformable resilient material is disposed in the annular groove 48. The seal ring 50 is preferably of circular cross-section and is of a size such that when disposed in the groove 48 and when the supporting member 38 is clamped against the annular flat flange portion 34 of the rupture disk 28, the seal ring 50 is deformed into sealing contact with the rupture disk 28 and the surfaces of the groove 48 providing a seal therebetween.

The supporting member 38 includes a continuous groove 52 disposed around the peripheral sides thereof so that an upper outwardly extended lip portion 54 is provided. A top portion 56 at the end 16 of the housing 12 is folded inwardly or crimped over the lip portion 54 of the supporting member 38 so that the lip portion 54 is deformed downwardly thereby rigidly clamping the supporting member 38 and the rupture disk 28 against the annular shoulder 20 of the housing 12 and deforming the seal ring 50 into sealing contact with the internal surfaces of the groove 48 and the rupture disk 28.

Referring now to FIG. 5, an enlarged sectional view of a portion of the apparatus 10 is illustrated. As shown in FIG. 5 when the upper end portion 56 of the housing 12 is folded over the outwardly extending lip 54 of the supporting member 38, the lip 54 is deformed downwardly past its yield point. This insures that the supporting member 38 is rigidly clamped against the annular flat flange portion 34 of the rupture disk 28 which is in turn rigidly clamped against the annular shoulder 20 of the housing 12 and against the seal ring 50.

The groove 52 is positioned in the peripheral side of the supporting member 38 with respect to the top thereof so that the lip portion 54 is of a known depth and thickness. The known depth and thickness of the lip portion 54 in combination with a knowledge of the type of material from which the supporting member 38 is formed allows the calculation of the force required to deform the lip portion 54 past its yield point using conventional engineering techniques. The force required for deforming the lip portion 54 of the supporting member 38 is the force exerted on the annular flat flange portion 34 of the rupture disk 28. Thus, the force or load placed on the rupture disk can be predetermined by controlling the size and placement of the groove 52 in the supporting member 38. In addition, the deformation of the lip portion 54 of the supporting member 38 around the entire periphery of the member 38 insures that the rupture disk 28 is rigidly held within the housing 12 under uniform load.

As shown in FIG. 5, the protuberance 46 can include serrations disposed therein to increase the cutting ability of the leading sharpened edge thereof. This embodiment of the apparatus 10 is particularly suitable for use in low pressure applications.

Referring now to FIG. 6, an enlarged sectional view of a portion of the apparatus 10 is illustrated including an alternate arrangement of the sealing means thereof. More specifically, the annular seating surface 42 of the supporting member 38 includes an annular recess 58 disposed therein adjacent the periphery thereof forming a flat surface 60 which is offset from the inner annular flat surface 42. The flat surface 60 of the member 38 is positioned opposite the groove 48 in the shoulder 20 of the housing 12 and the seal ring 50 so that when the supporting member 38 and rupture disk 28 are rigidly clamped against the shoulder 20 and the seal ring 48, the flat annular flange portion 34 of the rupture disk 28 is deformed into the recess 58 as shown in FIG. 6. The resulting stair step form of the annular flange portion 34 of the rupture disk 28 provides additional resistance to movement of the rupture disk between the supporting member 38 and the housing 12. As illustrated in FIG. 6 the protuberance 46 includes a discontinuity or cut out portion 62, the function of which will be described below.

OPERATION

In operation, the apparatus 10 is threadedly connected into a conventional fitting which is connected to the pressure system or vessel to be protected. As will be understood, the design rupture pressure of the rupture disk 28 is such that rupture does not occur so long as normal pressure levels are contained within the pressure system being protected. Fluid pressure from the system is communicated by way of the bore 26 to the convex surface of the rupture disk 28, and when an over pressure condition exists within the system, the force exerted on the rupture disk 28 causes the disk 28 to reverse itself within the housing 12. Upon the reversal of the disk 28, the concave-convex portion 32 thereof forcibly contacts the sharpened leading edge of the protuberance 46 causing the disk to be cut open. That is, a piece of the concave-convex portion 32 is cut out of the disk 28 thereby relieving pressure through the disk 28 and through the opening 40 of the support member 38 to the atmosphere.

As will be apparent, the embodiment of the assembly 10 illustrated in FIGS. 1 through 4 causes a circular portion of the rupture disk 28 to be cut away from the disk 28 upon rupture, which can pass through the opening 40 and be propelled to the exterior of the assembly 10. If it is desired that the cut portion of the rupture disk 28 remain attached to the uncut portion thereof upon rupture, a discontinuity is formed into the protuberance 46 so that the sharpened leading edge thereof is C-shaped. More specifically, referring to FIG. 6, a rectangular slot 62 is cut into the side of the protuberance 46 so that when the rupture disk 28 reverses itself and impales on the sharpened protuberance 46 a C-cut is made in the center portion of the disk causing the cut portion to fold upwardly into the opening 40 of the supporting member 38 but remain attached to the rupture disk 28 by the uncut portion thereof.

As will be readily apparent to those skilled in the art, the opening 40 in the supporting member 38 can take any of a variety of cross-sectional shapes. For example, the opening 40 can be formed in the shape of a polygon which results in a protuberance 46 having a plurality of sharp points thereon. Further, the supporting member 38 can be rigidly held within the housing 12 in a variety of ways other than by folding over the upper end portion of the housing 12 thereon such as by the use of a snap ring fitted into a groove disposed within the housing 12.

Thus, the apparatus of the present invention is well suited to carry out the objects and advantages mentioned as well as those inherent therein. While presently preferred embodiments of the invention have been described for purposes of this disclosure, numerous changes in the arrangement and construction of parts will readily suggest themselves to those skilled in the art which are encompassed within the spirit of this invention as defined by the appended claims.

What is claimed is:
1. A rupture disk assembly comprising:
a substantially cylindrical hollow housing having an inlet end and an outlet end and including an annular shoulder within the interior thereof facing the outlet end thereof;
a circular reverse buckling rupture disk positioned within said housing, the outer annular portion of said rupture disk lying adjacent and being supported on said annular shoulder of said housing;
an annular supporting member adapted to fit within said housing adjacent said rupture disk including an annular surface to coact with said annular shoulder in said housing and support the annular outer portion of said rupture disk therebetween, said supporting member including an annular lip portion extending outwardly around the periphery thereof; and
the outlet end of said housing being folded over said outwardly extending lip portion of said supporting member so that said lip portion is deformed towards the inlet end of said housing and said supporting member and said rupture disk are rigidly clamped against said shoulder within said housing.

2. The rupture disk assembly of claim 1 wherein said annular supporting member is further characterized to include a cutting edge means attached thereto positioned to cut said rupture disk upon the reversal thereof.

3. The rupture disk assembly of claim 1 which is further characterized to include:
said annular shoulder within the interior of said cylindrical housing including an annular groove disposed therein facing the annular outer portion of said rupture disk; and
an annular seal ring formed of deformable material disposed in said groove, said seal ring being of a size and shape such that a seal is provided thereby between said annular outer portion of said rupture disk and the surfaces of said groove.

4. The rupture disk assembly of claim 1 wherein said housing is further characterized to include:

the inlet end portion thereof including threads disposed around the outside periphery thereof adapted for threaded connection into a conventional female threaded fitting; and the outlet end thereof including a plurality of flat surfaces formed around the outside periphery thereof for facilitating threadedly connecting said housing into said fitting.

5. A rupture disk assembly comprising:

a cylindrical housing having a top end and a bottom end and having an internal recess at the top end thereof forming a flat upwardly facing annular shoulder therewithin;

a concave-convex reverse buckling rupture disk positioned within said housing having an annular flange portion connected to said concave-convex portion by a transition connection, said annular flat flange portion conforming with and being supported by said flat upwardly facing annular shoulder within said housing;

a flat annular supporting member having an outwardly extending annular lip portion of predetermined yield strength and having a flat annular supporting surface conforming with said annular flat flange portion of said rupture disk, said supporting member being positioned within said housing above said rupture disk so that said flat annular supporting surface thereof lies adjacent said annular flat flange portion of said rupture disk; and the top end portion of said cylindrical housing being folded over said outwardly extending annular lip portion of said supporting member so that said lip portion is deformed downwardly past the yield point thereof and said rupture disk and supporting member are rigidly held against said upwardly facing annular shoulder within said housing under a uniform force.

6. The rupture disk assembly of claim 5 wherein said annular supporting member is further characterized to include a circular outlet opening centrally positioned therein and a cutting edge means attached thereto positioned to cut said rupture disk upon the reversal thereof.

7. The rupture disk assembly of claim 6 wherein said cutting edge means comprise:

said supporting member including an annular recess in the face thereof adjacent said rupture disk, the inside diameter of said recess being greater than the diameter of said circular outlet opening in said supporting member thereby forming a cylindrical protuberance facing said rupture disk; and the leading edges of said cylindrical protuberance being sharpened to form a circular knife blade.

8. The rupture disk assembly of claim 7 which is further characterized to include:

the outside diameter of said annular recess in the face of said supporting member adjacent said rupture disk being less than the inside diameter of said upwardly facing annular shoulder within said cylindrical housing so that an inwardly extending annular shoulder is provided by said supporting member for supporting the transition connection of said rupture disk; and the transition connection of said rupture disk having a diameter such that said transition connection lies adjacent and is supported by said inwardly extending annular shoulder of said supporting member.

9. The rupture disk assembly of claim 7 wherein said sharpened cylindrical protuberance is further characterized to include a discontinuity in the sides thereof thereby forming a C-shaped knife blade whereby upon reversal of said rupture disk and the cutting thereof by said knife blade, the cut portion of said rupture disk remains attached to the uncut portion thereof.

10. The rupture disk assembly of claim 7 wherein said cylindrical protuberance is further characterized to include serrations in the sharpened leading edge thereof.

11. The rupture disk assembly of claim 7 which is further characterized to include:

said upwardly facing annular shoulder within said housing including an annular groove disposed therein facing said annular flat flange portion of said rupture disk; and an annular seal ring formed of deformable material disposed in said groove, said seal ring being of a size and shape such that a seal is provided thereby between said annular flat flange portion of said rupture disk and the surfaces of said groove.

12. The rupture disk assembly of claim 11 wherein said annular groove is of rectangular cross-section and said seal ring is of circular cross-section.

13. The rupture disk assembly of claim 12 wherein said flat annular supporting surface of said supporting member is further characterized to include in the annular recess disposed therein positioned opposite said annular groove in said shoulder of said housing and said seal ring disposed therein so that when said supporting member and said rupture disk are rigidly clamped against said shoulder and seal ring a portion of said annular flat flange portion of said rupture disk is deformed into said recess thereby increasing the holding force applied to said rupture disk.

14. The rupture disk assembly of claim 10 wherein said housing is further characterized to include:

the bottom end portion thereof including threads disposed around the outside periphery thereof and being adapted for threaded connection into a conventional female threaded fitting; and the top end portion thereof including a plurality of flat surfaces formed around the outside periphery thereof for facilitating threadedly connecting the bottom end portion into said fitting.

* * * * *